United States Patent
Ieda

(10) Patent No.: US 7,575,219 B2
(45) Date of Patent: Aug. 18, 2009

(54) LINEAR SOLENOID FOR EGR VALVE

(75) Inventor: João José Cardinali Ieda, Piracicaba (BR)

(73) Assignee: Wahler Metalurgica, Ltda., Piracicaba (BR)

( * ) Notice: Subject to any disclaimer, the term of this patent is extended or adjusted under 35 U.S.C. 154(b) by 0 days.

(21) Appl. No.: 11/207,299

(22) Filed: Aug. 19, 2005

(65) Prior Publication Data
US 2006/0076530 A1   Apr. 13, 2006

(30) Foreign Application Priority Data
Aug. 20, 2004   (BR) .................................. 0403705

(51) Int. Cl.
*F16K 31/02* (2006.01)
(52) U.S. Cl. .............................. 251/129.15; 251/129.16
(58) Field of Classification Search ............ 251/129.15, 251/129.16
See application file for complete search history.

(56) References Cited
U.S. PATENT DOCUMENTS

| | | | | |
|---|---|---|---|---|
| 5,467,962 A | * | 11/1995 | Bircann et al. | 251/129.15 |
| 5,901,940 A | * | 5/1999 | Hussey et al. | 251/129.15 |
| 5,924,675 A | * | 7/1999 | Hussey et al. | 251/129.15 |
| 6,062,536 A | * | 5/2000 | Bircann | 251/129.15 |
| 6,474,320 B1 | * | 11/2002 | Modien | 251/129.15 |
| 6,719,265 B2 | * | 4/2004 | Kloda et al. | 251/129.15 |
| 6,722,628 B1 | * | 4/2004 | Seil | 251/129.15 |
| 2001/0033214 A1 | * | 10/2001 | Bircann et al. | 335/220 |
| 2002/0104977 A1 | * | 8/2002 | Bircann et al. | 251/129.15 |

* cited by examiner

*Primary Examiner*—Stephen M Hepperle
*Assistant Examiner*—Andrew J Rost

(57) ABSTRACT

A linear solenoid for an EGR valve is presented in three alternatives in a constructive way, i.e., with manufactured tube carcass or casing, carcass or casing with deep print and with conformed cold carcass or casing. The linear solenoid with manufactured tube carcass comprises: fixed magnetic nucleous (1), electrical bobbin (2), sliding bushing (3), manufacture tube carcass (4), mobile magnetic nucleous (5), axle or connecting rod (6), conical magnetic nucleous (7) and fixing flange (8), and the solenoid with carcass with deep print composed by: fixed magnetic nucleous (20), sliding bushing (21), electrical bobbin (22) magnetic closing (23), mobile magnetic nucleous (24), axle or connecting rod (25), conical magnetic nucleous (26), carcass with deep print and fixing flange (28), and the solenoid with conformed cold carcass composed by: fixed magnetic nucleous (41), sliding tube (42), electrical bobbin (43), mobile magnetic nucleous (44), washer of lean (45), carcass (46), conical magnetic nucleous (47) incorporated to the mentioned carcass and assembling with this unique part, and fixing flange (48).

2 Claims, 6 Drawing Sheets

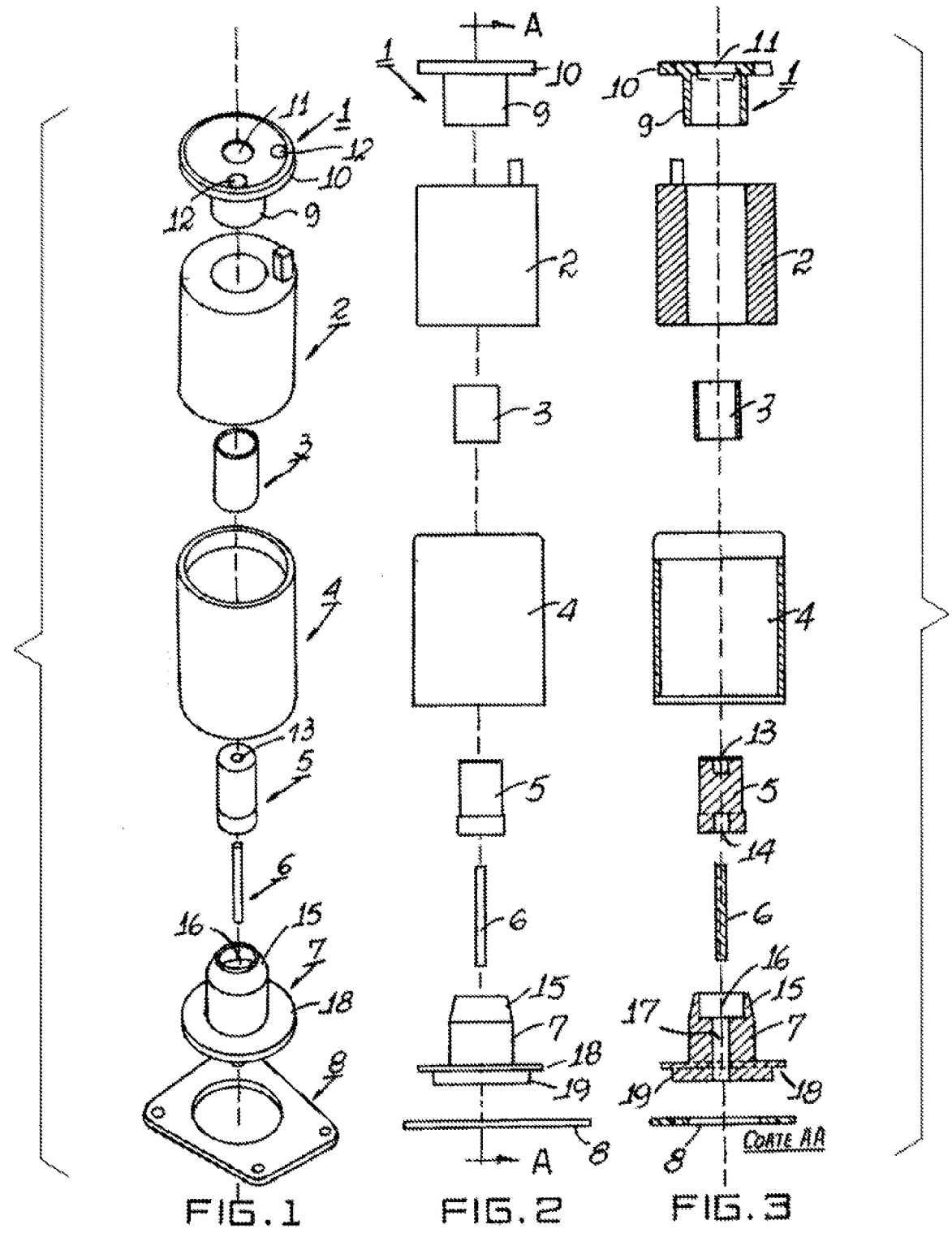

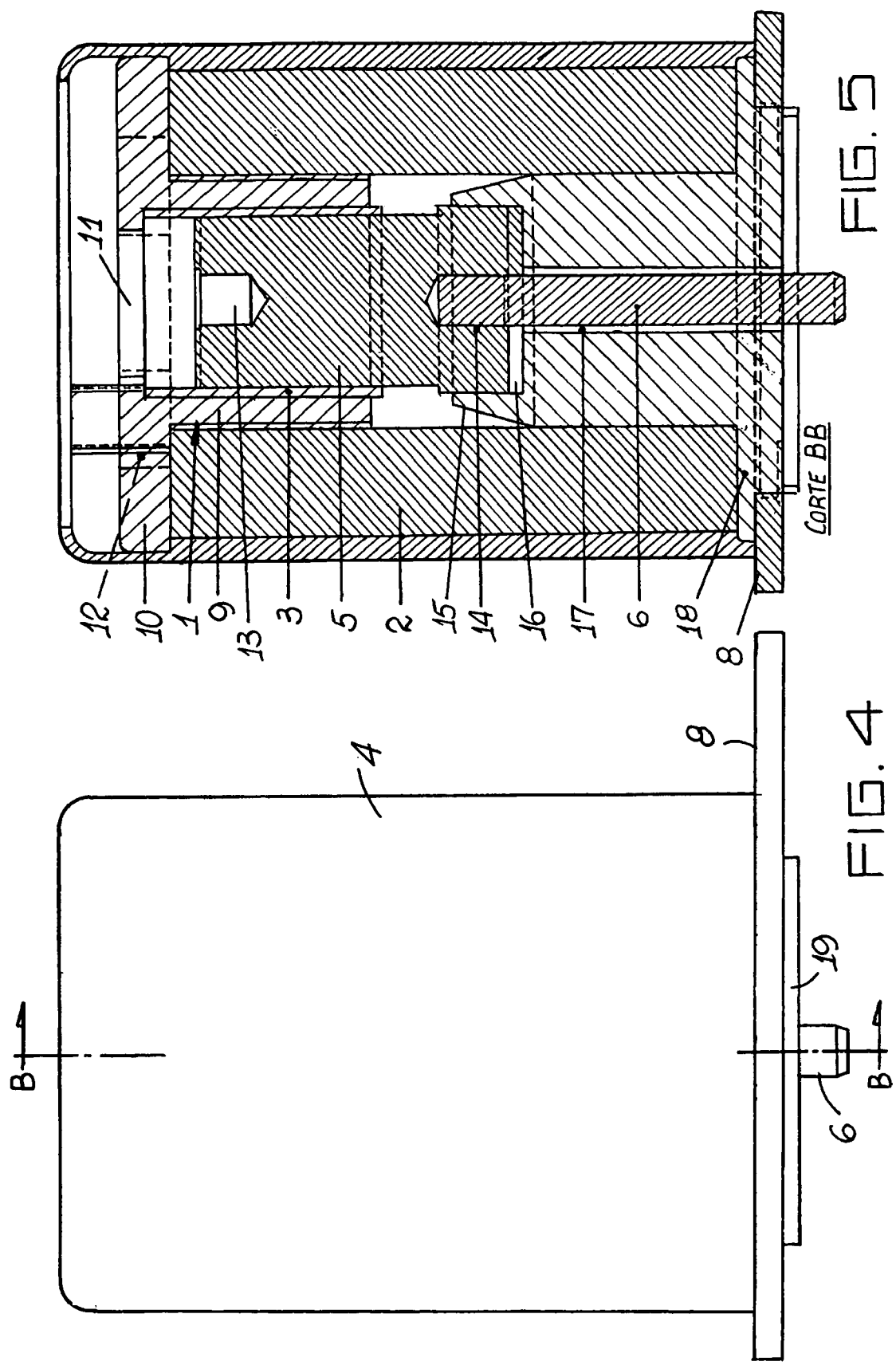

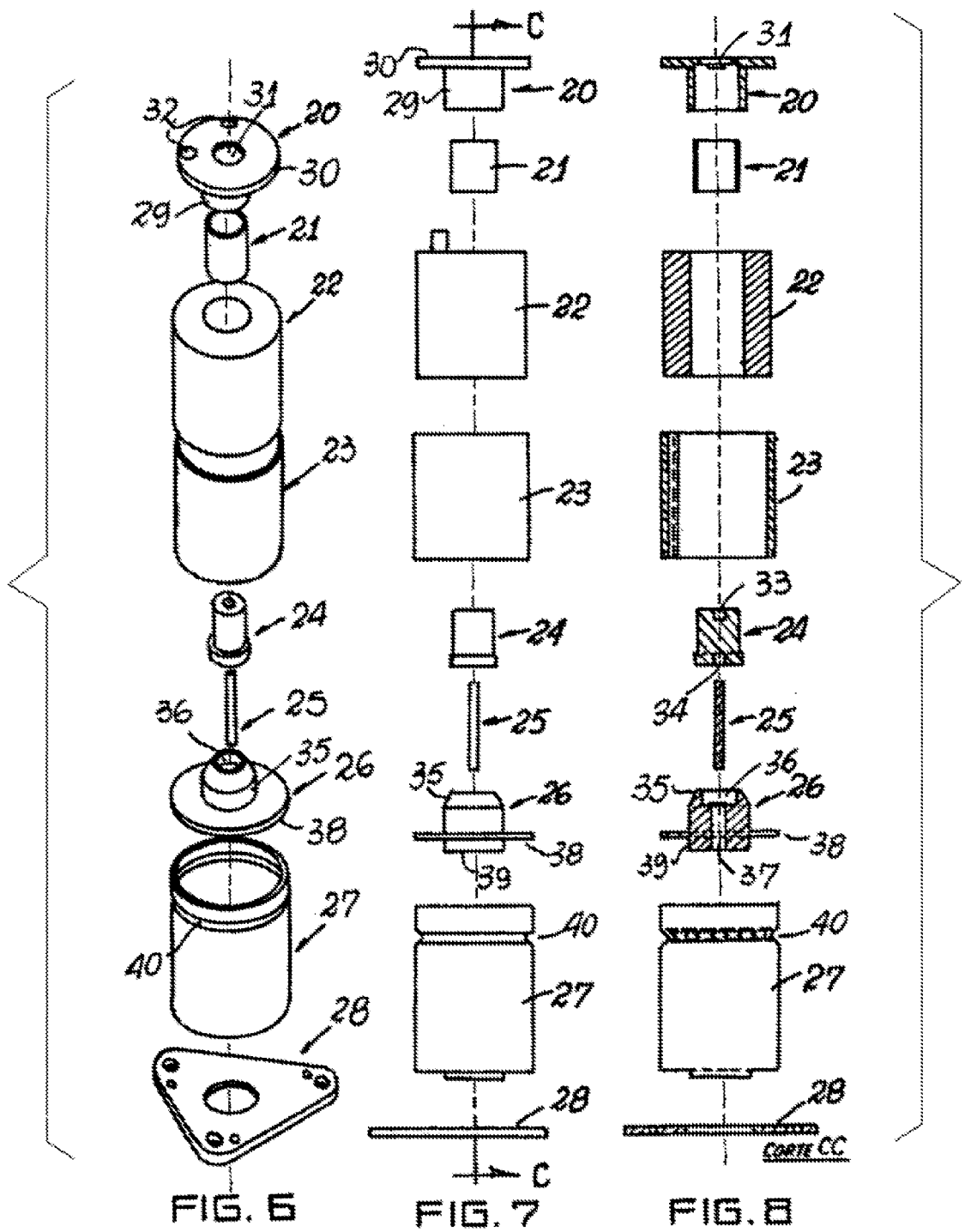

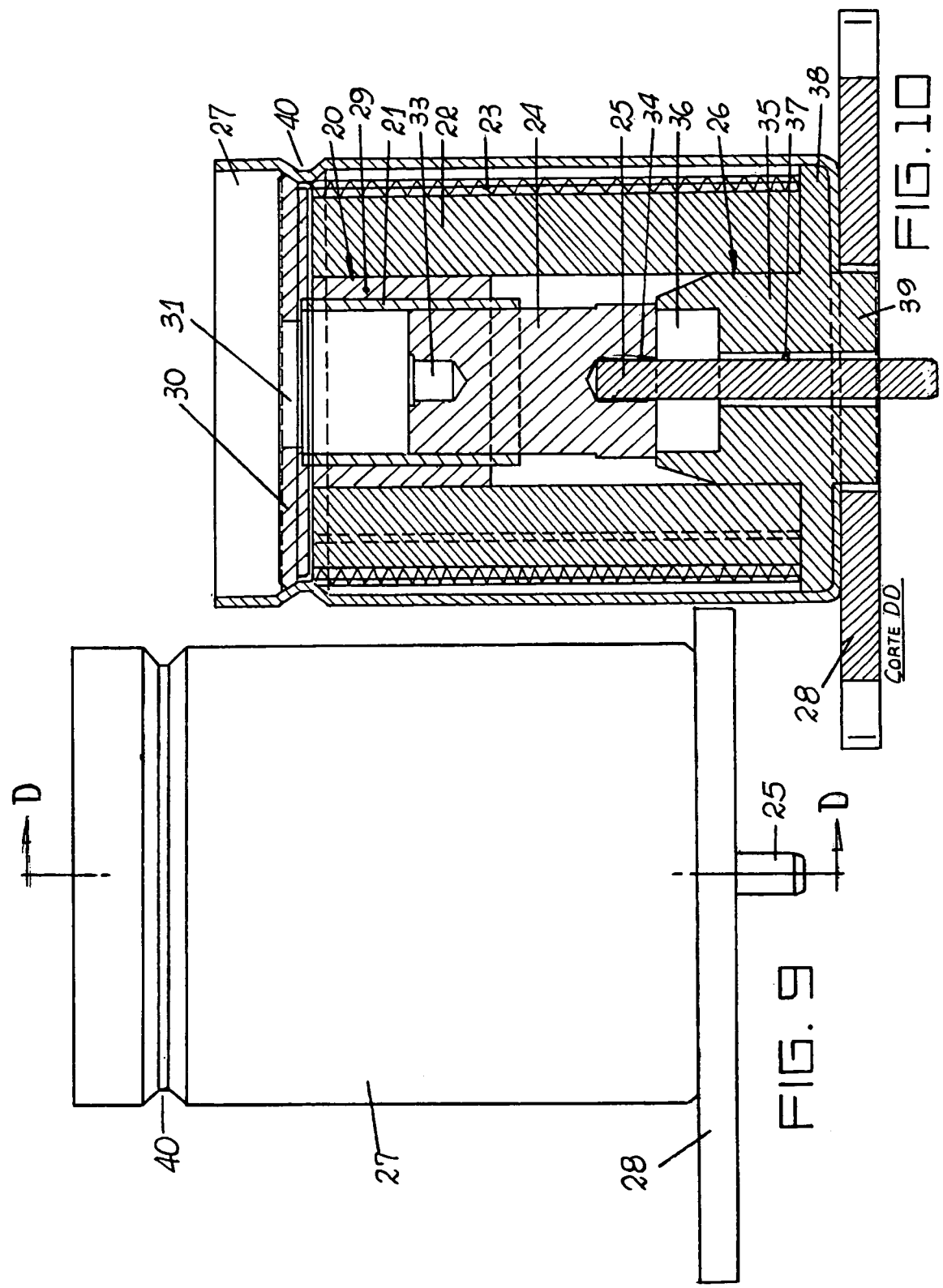

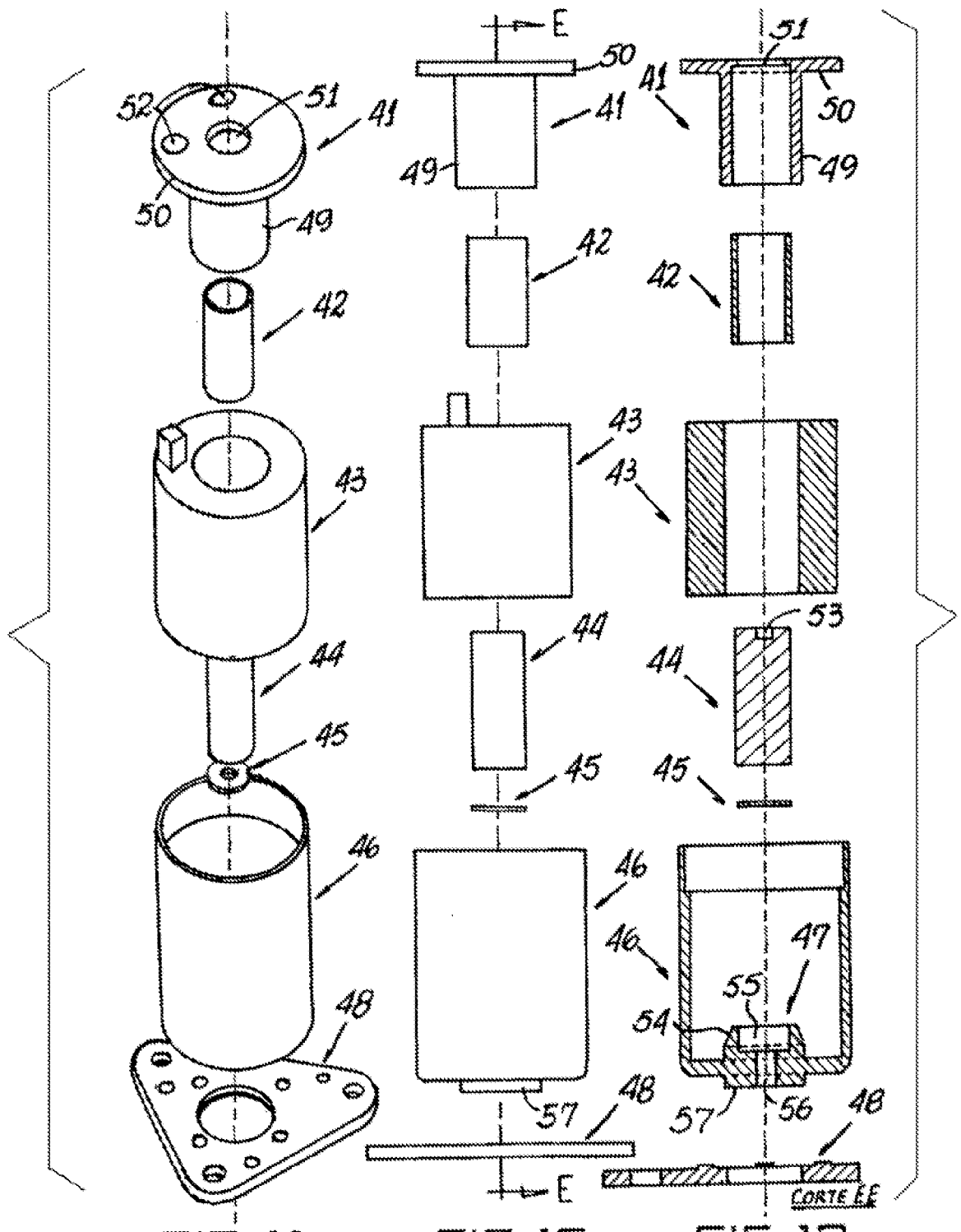

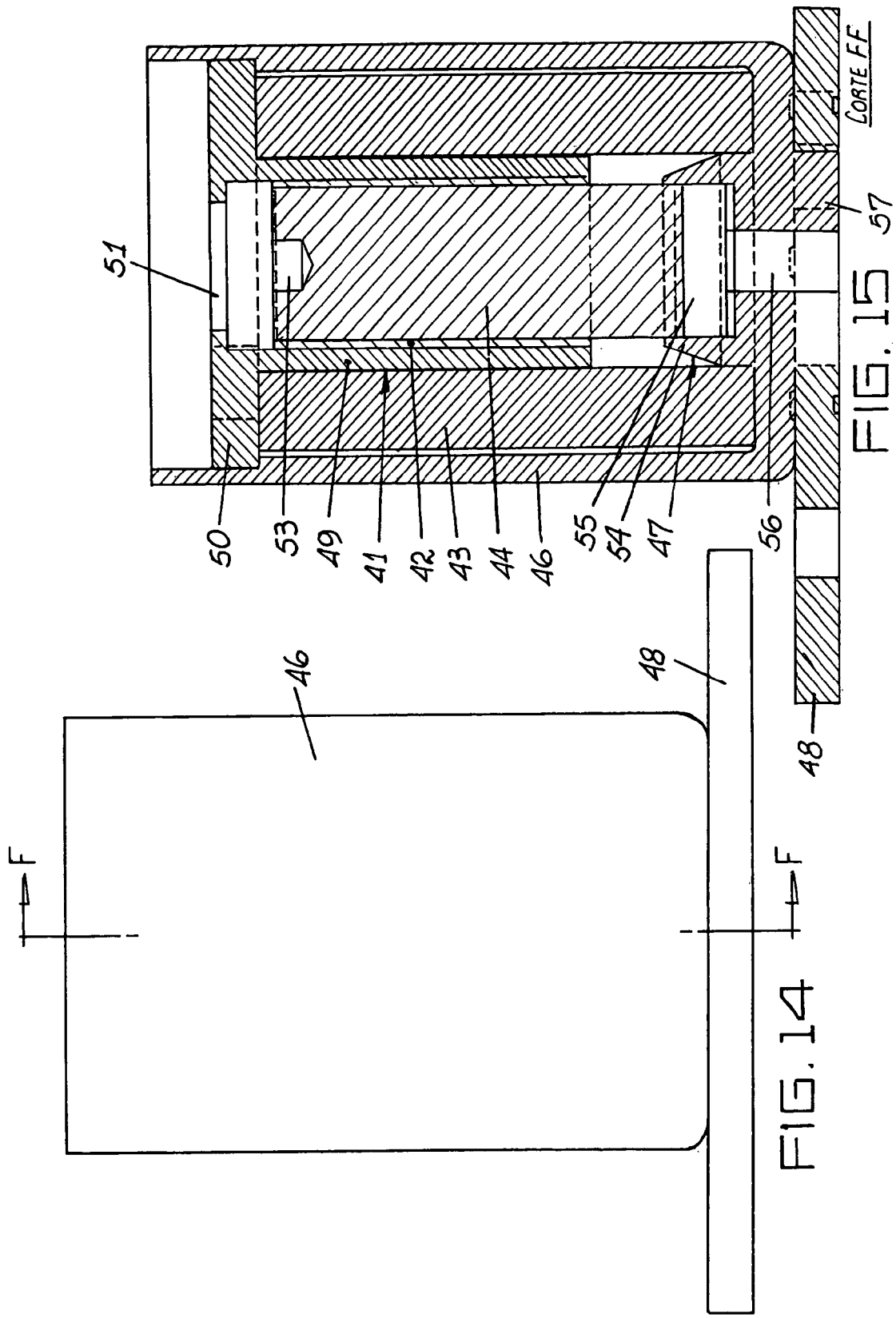

LINEAR SOLENOID FOR EGR VALVE

The present patent of linear solenoid invention for an EGR Valve, for use in the automobile industry, once that one of the most interesting advantages of this solenoid is to be presented in three alternatives in a constructive way: with a manufactured tube carcass or casing, with a carcass or casing with deep print and with conformed cold carcass or casing, all of them incorporating some important improvements of technical, practical and functional order, and one effect of better utilization and precision, consisting of an innovative conception of high technology, providing a series of advantages and benefits inherent to its applicability and functionality.

The linear solenoid is a machine, which transforms the electrical energy in magnetical energy, having as resultant the realization of work during a course. Used in applications of starting up of valves, as for example in the automobile industry, the solenoid has as its function realize the opening or closing of these valves through the balance of forces of the system.

The solenoid is fed by one signal PWM (modulation for pulse width) that, due to the variation of this pulse width, occurs proportionally the intensity variation of the magnetical field, winning the force contrary of the system spring. Manufactured tube carcass.

The most important advantages of this way of carcass are: less weight of the product and manufacturing process that, opposite to the conventionals, is more simple and economic, use less components and presents high sealing potential.

Carcass or casing with deep print.

The most important advantages of this way of carcass are: less weight of the product, low cost and the manufacturing process that, opposite to the conventionals, is more simple and economic, use less components and presents high sealing potential and reduction of the hot temperature focus of the bobbin.

Conformed cold carcass or casing.

The most important advantages of this way of carcass or casing are: manufacturing process more simple and economic, reduced number of components, high efficiency in the sealing, facility in the assembling, lower costs.

In the attached illustrative drawings are represented:

FIG. 1—perspective sight blown up of the solenoid version manufactured tube carcass;

FIG. 2—frontal sight blown up of the solenoid version manufactured tube carcass;

FIG. 3—blown up sight of the solenoid version manufactured tube carcass in cut, according to one plan indicated by the line AA in the previous figure;

FIG. 4—high sight of the solenoid manufactured tube carcass assembled;

FIG. 5—sight of the solenoid manufactured tube carcass assembled and cut according to one planning indicated by the line BB in the previous figure;

FIG. 6—perspective sight blown up of the solenoid version carcass with deep print;

FIG. 7—frontal blown up sight of the solenoid version carcass with deep print;

FIG. 8—blown up sight of the solenoid version carcass with deep print in cut, according to a plan indicated by the line CC in the previous figure;

FIG. 9—high sight of the solenoid version carcass with deep print assembled;

FIG. 10—sight of the solenoid version carcass with deep print assembled and in cut according to a plan indicated by the line DD in the previous figure;

FIG. 11—perspective blown up sight of the solenoid version conformed cold carcass;

FIG. 12—frontal blown up sight of the solenoid version conformed cold carcass;

FIG. 13—blown up sight of the solenoid version conformed cold carcass in cut, according to a plan indicated by the line EE in the previous figure;

FIG. 14—high sight of the solenoid version conformed cold carcass assembled; and FIG. 15—sight of the solenoid version conformed cold carcass assembled and in cut according to a plan indicated by the line FF in the previous figure.

As it is inferred of FIGS. 1, 2, 3, 4 and 5, the solenoid version manufactured tube carcass is composed by: fixed magnetic nucleous (1), electrical bobbin (2), sliding bushing (3), manufactured tube carcass (4), mobile magnetic nucleous (5), axle or connecting rod (6), conical magnetic nucleous (7) and setting flange (8).

The fixed magnetic nucleous (1) has tubular body (9) with superior circular border endowed with a central puncture (11) and two orifices (12) close to the peripheral edge. The mobile magnetic nucleous (5) owns cylindrical body with a not passing central puncture (13) in the superior extremity and a not passing central puncture (14) in the inferior extremity. The conical magnetic nucleous (7) owns cylindrical body with superior conical terminal (15) and one superficial socket (16) where starts a central orifice (17) extended until the inferior extremity, where it owns, externally one peripheral border (18) with circular basis of a minor diameter (19).

The FIG. 5 shows with details (sight in cut) the assembling of the solenoid with manufactured tube carcass. The fixed magnetic nucleous (1) is assembled in the superior extremity of the electrical bobbin (2), with peripheral border (18) supported in its border. The conical magnetic nucleous (7) is assembled in the inferior extremity of the electrical bobbin (2), with peripheral border (18) supported in its border. The mobile magnetic nucleous (5) owns its basis adjusted to the superficial socket (16) of the magnetic conical nucleous (7) and its superior extension installed with the sliding bushing (3) in the interior of fixed magnetic nucleous (1). This set is involved by the manufactured tube carcass (4) and connected to the flange (8) by means of the rabbet and setting of the circular base (19) of the conical magnetic nucleous (7) in the central opening of the said flange. The axle or connecting rod (6) is free passing by the central orifice (17) of the magnetical conical nucleous (7) and owns the superior extremity encased and settled in the central inferior puncture (14) of the mobile magnetic nucleous (5) and the inferior extremity exposed in the inferior part of the solenoid.

As inferred of FIGS. 6, 7, 8, 9 and 10, the solenoid version carcass with deep print is composed by: fixed magnetic nucleous (20), sliding bushing (21), electrical bobbin (22), magnetic closing (23), mobile magnetic nucleous (24), axle or connecting rod (25), conical magnetic nucleous (26), carcass (27) of deep print and setting flange (28).

The fixed magnetic nucleous (20) owns tubular body (29) with superior circular border (30) endowed with a central puncture (31) and two orifices (32) close to the peripheral border. The mobile magnetic nucleous (24) owns cylindrical body endowed with a central not passing puncture (33) in the superior extremity and a not passing central puncture (34) in the inferior extremity. The magnetic conical nucleous (26) owns a cylindrical body with conical superior terminal (35) and a superficial socket (36) where starts a central puncture (37) extended until the inferior extremity, where owns, externally, a peripheral border (38) with a circular base of a minor diameter (39). The carcass (27) of deep print owns in the superior part and next to the mouth a thin "peripheral strangulation" (40).

The FIG. 10 shows with details (sight in cut) the assembling of the solenoid with carcass with deep print. The fixed magnetic nucleous (20) is assembled in the superior extremity of the electrical bobbin (22), with circular border (30) supported in its edge.

The mobile magnetic nucleous (24) owns its base adjusted to the superficial socket (36) of the conical magnetic nucleous (26) the superior extension installed with the sliding bushing (21) in the interior of the fixed magnetic nucleous (20) The axle or connecting rod (25) owns its superior extremity encased and settled in the central inferior puncture (34) of the mobile magnetic nucleous (24) and its extension is freely passer-by for the central puncture (37) of the conical magnetic nucleous (26). This set is involved for the element of the magnetic closing (23) and as well assembled in the interior of the carcass with deep print (27), connected to the flange (28) by means of the rabbet and setting of the circular base (39) of the conical magnetic nucleous (26) in the central opening of the said flange (28).

As shown in FIGS. 11, 12, 13, 14 and 15, the solenoid version conformed cold carcass, is composed by: fixed magnetic nucleous (41), sliding tube (42), electrical bobbin (43), mobile magnetic nucleous (44), washer of lean (45), carcass (46)+magnetic conical integrated nucleous (47) and setting flange (48).

The fixed magnetic nucleous (41) owns a tubular body (49) with circular superior border (50) endowed with a central puncture (51) and two orifices (52) next to the peripheral border. The mobile magnetic nucleous (44) owns cylindrical body with a not passing central puncture (53) in the superior extremity. The conical magnetic nucleous (47) is connected to the conformed cold carcass (46), centrally in the deep of the same, setting with this only one part; owns a cylindrical body with conical superior terminal (54) and one superficial socket (55) where starts one central puncture (56) extended until the inferior extremity, where is defined one base (57) exposed in the inferior part of the said carcass.

The FIG. 15 shows in details (sight in cut) the assembling of the solenoid with conformed cold carcass. The body of the conical magnetic nucleous (47) is settled in the inferior extremity of the electrical bobbin (43), which is connected in the interior of the conformed cold carcass (46). The fixed magnetic nucleous (41) is assembled in the superior extremity of the electrical bobbin (43), with its tubular body (49) incased in the same, and it owns a circular border (50) supported in its border. The mobile magnetic nucleous (44) owns its inferior extremity adjusted in the superficial socket (55) of the conical magnetic nucleous (47) and its extension installed with the sliding tube (42) in the interior of the fixed magnetic nucleous (41). This set is connected to the flange (48) by means of the rabbet and setting of the base (57) of the conical magnetic nucleous (47), incorporated to the conformed cold carcass (46), in the opening of the said flange (48).

The invention claimed is:

1. A linear solenoid for an EGR valve, the valve having a carcass with a deep print, the linear solenoid comprising:
a fixed magnetic nucleus (20), a sliding bushing (21) disposed within the fixed magnetic nucleus, an electrical bobbin (22), a magnetic closing (23), a mobile magnetic nucleus (24), an axle or connecting rod (25), a conical magnetic nucleus (26), the carcass with the deep print (27) and a fixing flange (28), the fixed magnetic nucleus (20) having a tubular body (29) within which is disposed the sliding bushing (21), the fixed magnetic nucleus having with a circular superior border (30) having a central puncture (31) and two orifices (32) next to the peripheral border, the mobile magnetic nucleus (24) having a cylindrical body provided with a central puncture (33) which does not pass into a superior extremity and a central puncture (34) which does not pass into an inferior extremity and in which the rod is encased and supported in contact with the mobile magnetic nucleus such that the mobile magnetic nucleus restrains radial and axial movement of the rod and the rod moves with the mobile magnetic nucleus, the conical magnetic nucleus (26) having a cylindrical body with a superior conical terminal (35) and a superficial socket (36) which provides a stop for the inferior extremity of the mobile magnetic nucleus, wherein the inferior extremity of the mobile magnetic nucleus (24) is not disposed within the sliding bushing (21) and the sliding bushing (21) does not extend into the conical magnetic nucleus (26), the superficial socket (36) leading to a central puncture (37) which extends to the inferior extremity and which is of a sufficiently close tolerance with respect to the rod (25) such that the conical magnetic nucleus (26) sufficiently restrains radial movement of the rod (25), the conical magnetic nucleus(26) having, externally, one peripheral border (38) with a circular base of a minor diameter (39), the carcass with the deep print having in a superior part and close to a mouth thereof, a slim peripheral strangulation (40) extending completely around a periphery of an outer surface of the carcass directly radially outward of the circular superior border (30) and defining a groove in the outer surface of the carcass (27).

2. The linear solenoid for the EGR valve, according to claim 1, wherein the fixed magnetic nucleus (20) is assembled in the superior extremity of the electrical bobbin (22), the circular border (30) being supported by the electrical bobbin border; the mobile magnetic nucleus (24) having a base movable in the superficial socket (36) in the conical magnetic nucleus (26), the superior extension lodged with the sliding bushing (21) in an interior of the fixed magnetic nucleus (20), the axle and connecting rod (25) having a superior extremity disposed within the central inferior puncture (34) of the mobile magnetic nucleus (24) and having an extension freely passing through the central puncture (37) of the conical magnetic nucleus (26); the solenoid being connected to the flange (28) by means of a rabbet and seated by the circular base (39) of the conical magnetic nucleus (26) in the central opening of the flange (28).

\* \* \* \* \*